United States Patent
Habacker

(10) Patent No.: US 7,392,873 B2
(45) Date of Patent: Jul. 1, 2008

(54) HOOD COMPARTMENT COVER FOR A CABRIOLET VEHICLE WITH A RETRACTABLE HOOD

(75) Inventor: Norbert Habacker, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 616 days.

(21) Appl. No.: 10/531,091

(22) PCT Filed: Oct. 4, 2003

(86) PCT No.: PCT/DE03/03280

§ 371 (c)(1), (2), (4) Date: May 4, 2005

(87) PCT Pub. No.: WO2004/035337

PCT Pub. Date: Apr. 29, 2004

(65) Prior Publication Data

US 2006/0012213 A1    Jan. 19, 2006

(30) Foreign Application Priority Data

Oct. 12, 2002   (DE) .................... 102 47 725

(51) Int. Cl.
*B60J 7/20* (2006.01)

(52) U.S. Cl. ........... 180/69.2; 296/107.07; 296/107.08; 296/107.09; 296/107.11; 296/107.15; 296/116; 296/117; 296/121; 296/136.04; 296/136.1; 180/69.21

(58) Field of Classification Search ............... 180/69.2, 180/69.21; 296/107.07, 107.08, 107.09, 296/107.11, 107.15, 116, 117, 121, 136.04, 296/136.1

See application file for complete search history.

(56) References Cited

U.S. PATENT DOCUMENTS

| 5,197,778 | A | * | 3/1993 | Burst | 296/107.08 |
| 5,267,769 | A | * | 12/1993 | Bonne et al. | 296/107.08 |
| 5,558,389 | A | | 9/1996 | Rothe et al. | 296/107 |
| 5,816,644 | A | * | 10/1998 | Rothe et al. | 296/107.18 |
| 5,967,593 | A | * | 10/1999 | Schuler et al. | 296/136.06 |
| 5,975,619 | A | * | 11/1999 | Dettling et al. | 296/107.08 |
| 6,364,396 | B1 | * | 4/2002 | Hayashi et al. | 296/136.06 |
| 6,454,342 | B2 | * | 9/2002 | Heselhaus et al. | 296/107.07 |
| 6,454,343 | B1 | * | 9/2002 | Wagner et al. | 296/107.08 |
| 6,502,891 | B2 | * | 1/2003 | Russke | 296/107.17 |

FOREIGN PATENT DOCUMENTS

| DE | 199 12 893 | 9/2000 |
| DE | 199 59 700 | 2/2001 |

* cited by examiner

*Primary Examiner*—Christopher Ellis
*Assistant Examiner*—Jacob Meyer
(74) *Attorney, Agent, or Firm*—Gudrun E. Huckett

(57) ABSTRACT

A convertible vehicle has a carbody and a foldaway top connected to the carbody. A top compartment receives the foldaway top when folded open. A top compartment lid is provided for closing the top compartment. A hinge device is connected to the carbody and to the top compartment lid so that the top compartment lid is pivotable relative to the carbody. The top compartment lid has a front end interacting with a locking device in the area of a lateral side rail for locking it on the side rail by a push-pivot movement; it is released by a reverse movement. A lifting drive acting on the top compartment lid is supported on the carbody spaced from the hinge device and is pivotably connected to the top compartment lid. The top compartment lid is pivotable in the area of the hinge device relative to support part of the hinge device.

22 Claims, 4 Drawing Sheets ns with a folding top, with a top compartment receiving the top in its open position, which compartment can be closed by a top compartment lid extending within the rear carbody contour, which is pivotably supported with one end by means of a hinge device with a support part on the vehicle carbody and with the other end interacts relative to the folding top with at least one locking device provided in the area of a lateral top cloth side rail of the top, in whose area the top compartment lid can be locked on the top cloth side rail by a push-pivot movement and unlocked in the opposite direction.

In a known convertible vehicle (EP 0 638 453 B1), a top compartment is provided for receiving rearwardly the folding top in the open position, wherein the top compartment can be closed by a top compartment lid. For its movement, a single drive is provided arranged centrally in the rear area of the vehicle with which an actuating movement is transmitted by deflecting modules such onto two hinge devices in the lateral rear area of the top compartment lid that the top compartment lid is pivotable upwardly into its open position and from the open position can be pivoted back. In this connection, the top compartment lid upon returning pivot action can be moved into the closed position such that in this movement phase a side rail for the top cloth becomes entrained and, in this way, the folding top connected thereto can be secured together with the top compartment lid by means of a pivot-push movement in the area of a locking device. Because of the movement modules to be actuated by the drive as intermediate members, the drive kinematics are complex with regard to manufacture and a large mounting space is required.

The invention concerns the problem of configuring a convertible vehicle with foldaway top in the area of the top compartment lid such that the latter, with minimal technical expenditure, enables a synchronization of its movement with the movement of the top and, in this connection, few parts of the drive kinematics are optimally adjustable to a tight mounting space within the vehicle.

SUMMARY OF THE INVENTION

Based on a convertible vehicle with foldaway top of the aforementioned kind, the invention solves this problem in that as a drive of the top compartment lid at least one lifting drive is provided that is supported at a spacing to the hinge device and pivotably connected to the top compartment lid, and in that the top compartment lid in the area of the hinge device is pivotable relative to the support part. With regard to important further embodiments, reference is being had to the dependent claims.

The convertible vehicle according to the invention has top kinematics in the area of its top compartment lid with a guide unit wherein a hydraulic lifting device acting by means of an actuator on the top compartment lid and a hinge device supported rearwardly at a spacing thereto interact with one another optimally with few hinged parts as a functional component series.

The top compartment lid has only two drives that are mirror-symmetrically arranged relative to the longitudinal center plane of the vehicle and are comprised form of actuators that are supported in a buckling resistant way on its underside and a lifting drive, respectively, pivotably connected to the other end of the actuators. The top compartment lid is integrated directly into the flow of force created upon its movement. With minimal expenditure and few parts, an optimal control is achieved by means of this pivot system in the first pushing movement phase required for releasing or locking as well as in a second pivoting movement phase required for completely releasing or covering the top compartment.

The drive concept has few components and can be designed as a whole in an optimal way with regard to loads so that by means of uniform force deflections a delay-free movement results with which a minimal wear susceptibility and thus a long service life of the component modules are ensured.

BRIEF DESCRIPTION OF THE DRAWINGS

Further details and advantageous embodiments of the convertible vehicle according to the invention result from the following description and the drawing in which one embodiment of a top compartment lid moveable according to the invention is schematically illustrated. In the drawing, it is shown in.

DESCRIPTION OF PREFERRED EMBODIMENTS

Figure 1:
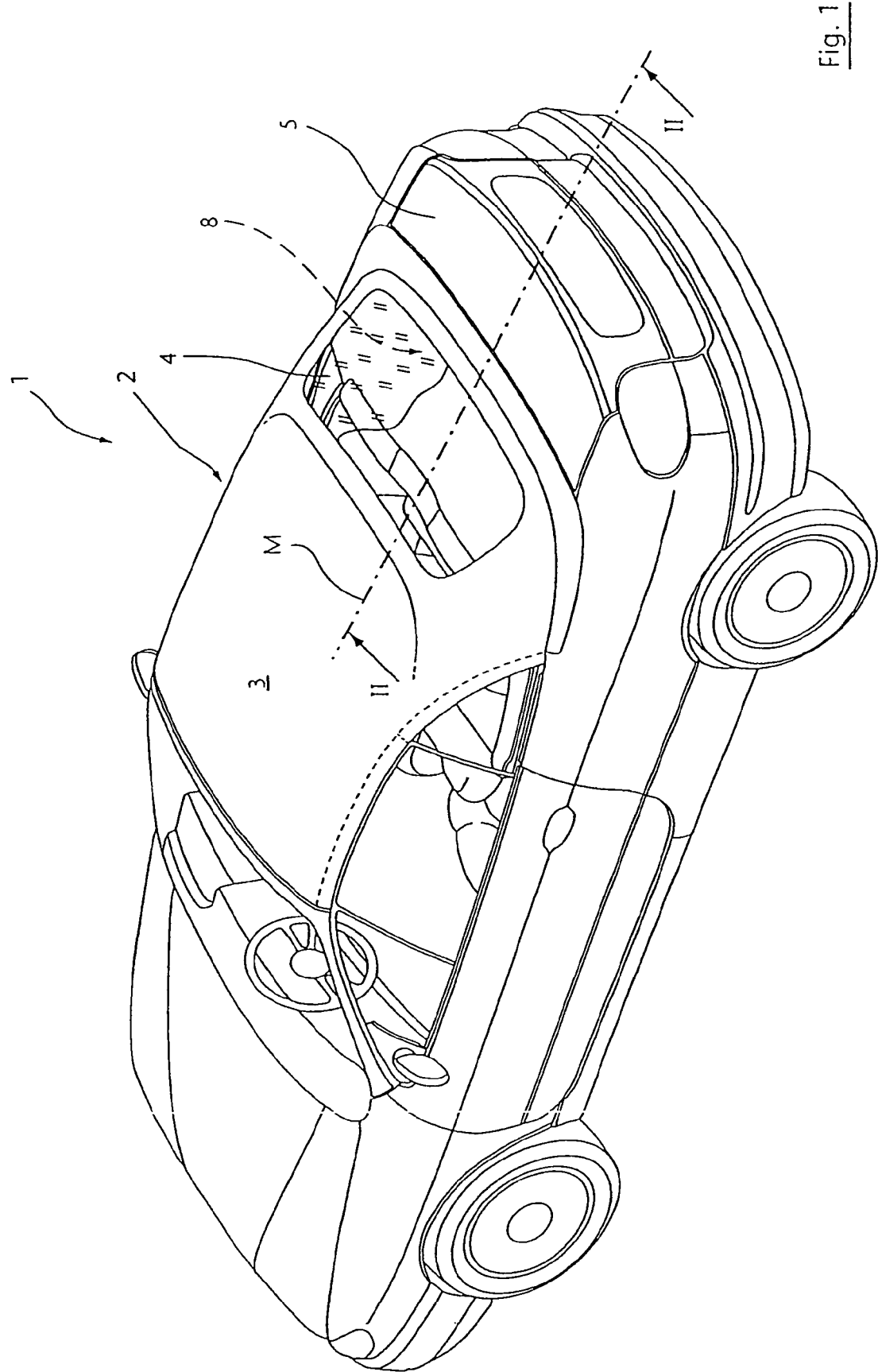
FIG. 1 a perspective rear view of a convertible vehicle with a folding top in closed position.

In FIG. 1, a convertible vehicle identified by 1 is illustrated in a perspective illustration wherein its closed folding top 2 has a rear window 4 that is integrated into the top cloth 3. In the illustrated closed position, the top cloth 3 in the rear area is positioned underneath the rear window 4 on a top compartment lid 8 (FIG. 2) that is arranged in a common plane with a trunk lid 5. A top compartment 6 for receiving the top 2 is closable by means of this top compartment lid 8 that extends substantially in a U-shape within the rear carbody contour. In the following, the kinematic components are illustrated in principle wherein in the area of the top cloth 3 the vehicle carbody and the configuration of the folding top 2 are not illustrated.

Figure 2:
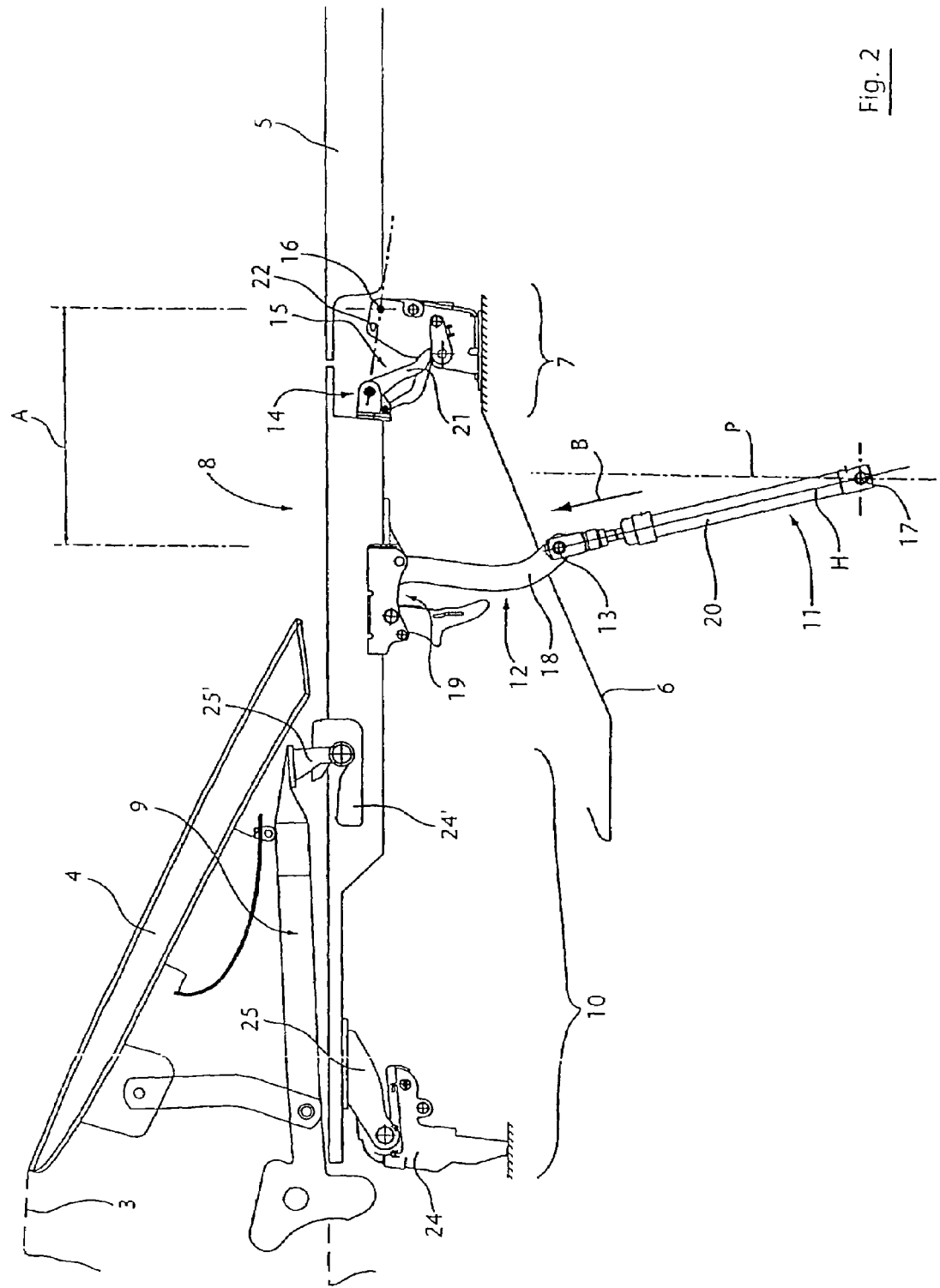
FIG. 2 a schematic side view of the drive kinematics in the rear area of the vehicle (without top cloth of the folding top) according to a line II-II of FIG. 1.
Figure 3:
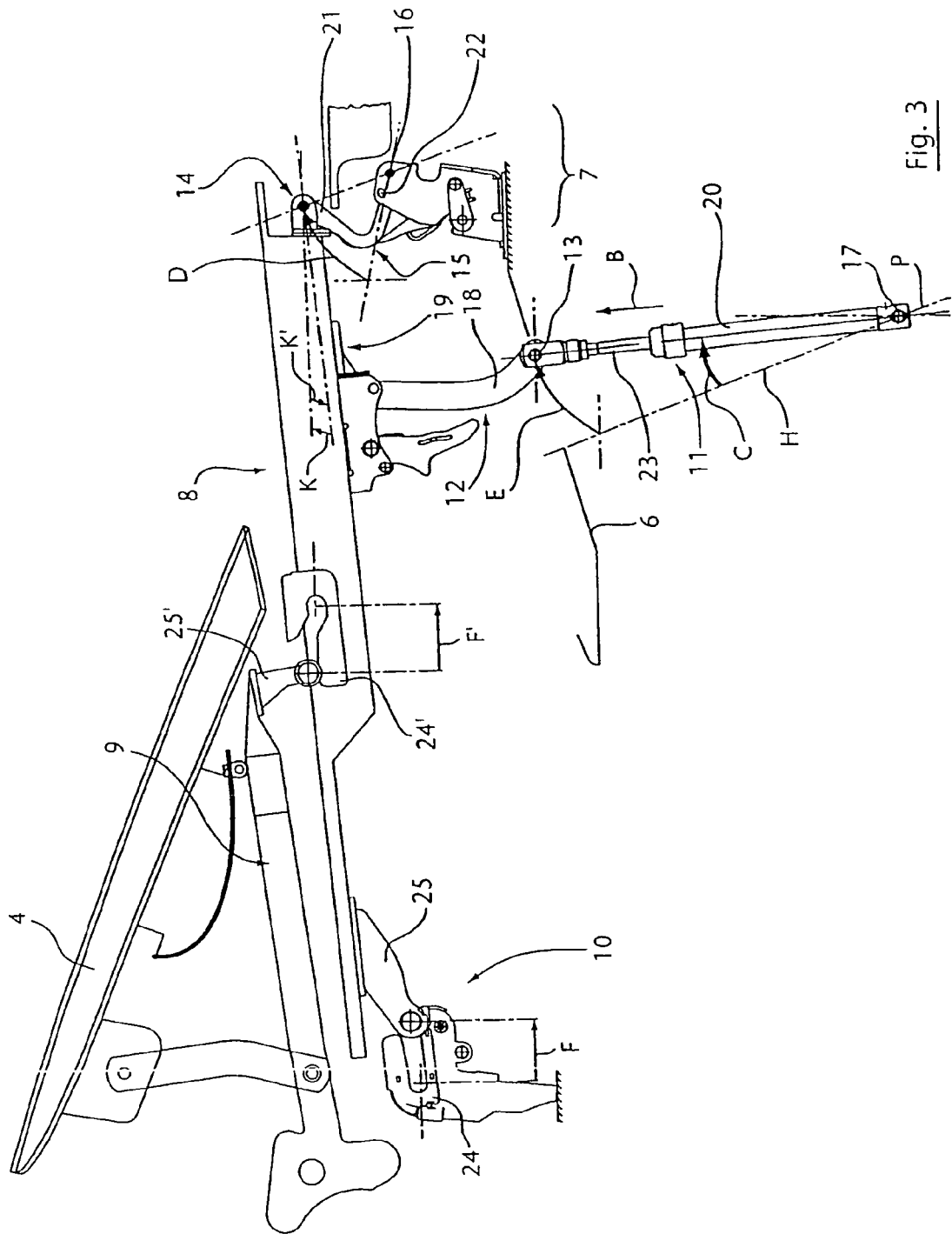
FIG. 3 a side view similar to FIG. 2 with top cloth side rail and top compartment lid in a first movement phase.
Figure 4:
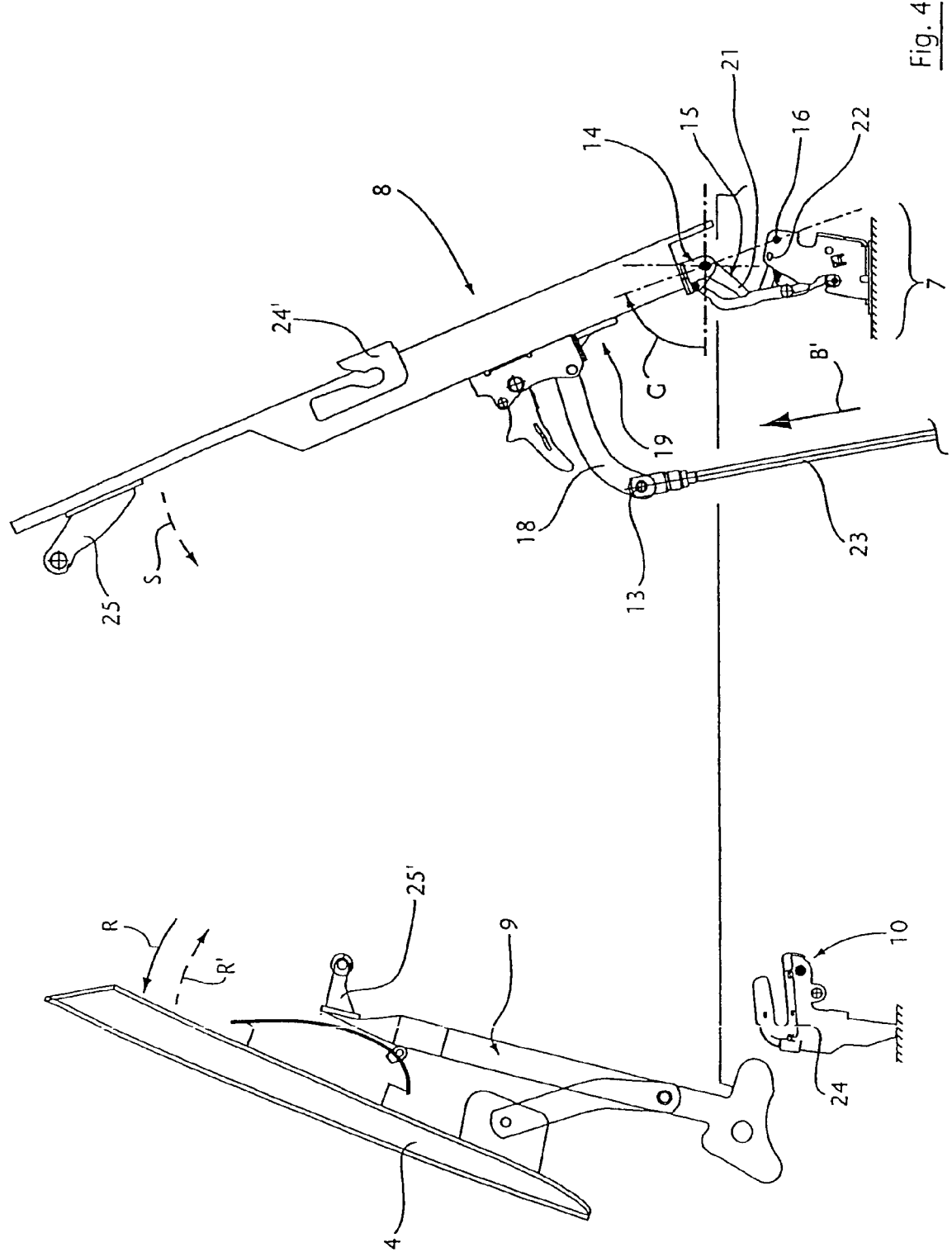
FIG. 4 a side view similar to FIG. 3 with a top cloth side rail and rear window as well as the top compartment lid oppositely moved into the open positions.

The top compartment lid 8 is supported pivotably on the vehicle carbody by two hinge devices 7 (and 7' that is not illustrated in detail in the side views of FIGS. 2 to 4), respectively, that are mirror-symmetrical to a longitudinal center plane M of the vehicle. Forwardly in the traveling direction, the top compartment lid 8 interacts with at least one locking device 10 provided in the area of a lateral top cloth side rail 9. EP 0 638 453 B1 discloses that in the area of such locking devices 10 the top compartment lid 8 can be locked, or unlocked in the opposite direction, on the top cloth side rail 9 by a pivot-push movement.

For realizing this movement, the convertible vehicle 1 according to the invention has a top compartment lid 8 that is provided laterally with a lifting drive 11 and 11', respectively (in the section views, only one is visible). The lifting drive 11 engages from below the top compartment lid 8 in front of the hinge device 7 at a spacing A therefrom. The lifting drive 11 engages essentially with a vertical lifting axis H an actuator 12 connected to the top compartment lid 8 in the area of a hinge connection 13. By means of this drive concept comprising only a few components, it is achieved that the top compartment lid 8 can be pivoted on a movement path that is guided essentially by the actuator 12 of the lifting drive 11 and the hinge device 7.

In this connection, initially a first relative movement of the top compartment lid 8 from a slanted orientation into approximately a horizontal orientation can be performed (arrow K of FIG. 3). Moreover, a further relative movement relative to the support part 15 can be realized, i.e., from the horizontal orientation into a slantedly upwardly oriented opening position (arrow G of FIG. 4).

The actuator 12 forms with the hinge device 7 a functionally connected guide unit that has at least three hinges. They are connected in a serial connection comprising as hinges the pivoting connection 13 of the lifting drive 11 to the actuator 12, the pivoting connection 14 of the top compartment lid 8 to a support part 15 of the hinge device 7, and its pivoting support 16 for the support part 15.

It is functionally important in this connection that the lifting drive 11 also has a pivoting connection 17 at the lower rear area of the vehicle car body (FIG. 3) that enables pivoting about a vertical axis P. In this connection, the lifting drive 11 is pivotably supported with its end opposite the hinge connection 13 to the actuator 12 by means of a hinge support, not illustrated in detail, wherein also different types of support are conceivable. With this support construction, the lifting drive 11 is pivotable parallel to the longitudinal center plane M of the vehicle, as illustrated in FIG. 3 by arrow C.

In the illustrated configuration, the top compartment lid 8 has a lifting cylinder 20 as a lifting drive 11; the cylinder is pivotably connected to a lever arm 18 with curved longitudinal contour that is provided as an actuator 12. This lever arm 18 is stationarily connected with the end opposite the hydraulic cylinder 20 and its pivoting connection 13 to the underside of the top compartment lid 8 by support parts 19 so as to be buckling resistant.

The lever arm 18 provided with the pivotably connected hydraulic cylinder 20 is supported particularly in the area between the forward locking device 10 and the rear hinge device 7 such that the latter, when introducing a control movement (arrow B), can be optimally actuated and, at the same time, the hinge device 7 that is positioned at a spacing A to the area where the lifting action is introduced can receive and transmit the actuation forces optimally with regard to loads.

In FIG. 2, the closed position of the component modules before opening the top compartment lid 8 is illustrated; upon subsequent activation of the lifting drive 11 (FIG. 3, arrow B), the lid passes through two movement phases that pass into one another substantially continuously. The intermediate position that is reached by means of the first movement phase is illustrated in FIG. 3 and the second movement phase that follows continuously subsequently is illustrated in the illustration according to FIG. 4 by means of the final open position.

In the first movement phase, the hydraulic cylinder 20 is actuated in the direction of arrow B and, in this way, through the lever 18 a lifting force is introduced into the top compartment lid 8 (FIG. 2). The components engaging one another up to this point in the area of the locking device 10 in a connecting position are released from a securing position in that, upon continuation of the lifting movement (FIG. 3), the push pivot movement illustrated by arrow D is initiated in the area of the hinge device 7. At the same time, a movement path illustrated by arrow E is imparted on the hydraulic cylinder 20, movable in the direction of arrow C, by means of the hinge device 13 that is facing the support lever 18.

By means of this guiding action comprising the movement phases D and E, the top cover compartment lid 8 is lifted and displaced so that in the area of the locking device 10 at the same time a substantially horizontal release movement according to arrows F and F' is achieved. As a result of the pivoting action in the area of the connection 14 of the top compartment lid 8 on the support part 15 of the hinge device 7 it is ensured that synchronously with the movements D and E a relative movement (arrow K) can occur and, by means of a terminal tilting of the top compartment lid 8 (FIG. 3), an optimal control in the area of the hinge series 17, 13, 14, 16 is realized.

For this movement control, the hinge device 7 has an L-shaped pivot lever 21 as a support part 15 for supporting pivotably the top compartment lid 8; the lever 21 in a first opening phase according to FIG. 3 can be moved toward a stop 22 and can rest against it. In this connection, the guide unit formed by the lifting drive 11 and the hinge device 7 cooperates at least during some phases synchronously with the locking device 10 so that a uniform and continuous displacement of the top compartment lid 8 is realized and all bearing modules are loaded only minimally by jolt-free movements.

The second movement phase illustrated in FIG. 4 shows that for reaching a completely open position of the top compartment lid 8 the piston rod 23 of the hydraulic cylinder 2 is further extended in the direction of arrow B' and only a pivot movement according to arrow G about the hinge 14 on the support part 15 of the hinge device 7 takes place. Prior to this, the folding top 1 can be pivoted also upwardly by drives, not illustrated, in the area of the rear window 4 and the top cloth side rail 9 (arrow R) and, subsequently, the folding top 4 can be pivoted into the top compartment 6 (arrow R').

It is understood that upon a closing movement of the top compartment lid 8 (across inwardly positioned top or in its closed position), the described continuous movement course is carried out in reverse wherein by arrow S the start of the movement is indicated only, without illustrating the additional partial movements again.

The locking device 10 provided at the front on the top compartment lid 8 is formed by two component modules comprised of an abutment 24, 24' and a catch hook 25, 25', respectively, wherein the parts 24 and 25 form a connection of the top compartment lid 8 to the vehicle carbody and the parts 24' and 25' provide a connection to the top cloth side rail 9. The two abutments 24 and 24' of the two locking modules are formed as slide guides in which the catch hooks 25, 25' are guided during the first movement phase (FIG. 3) according to arrows F and F'.

In an expedient embodiment, in the area of the locking modules at least one tactile sensor (not illustrated) is provided, respectively, for detecting the position of the catch hooks 25, 25'. For adjustment of these locking modules on the guide unit of the lifting drive 11 and hinge device 7 in the area of the slide guides adjustable guide components can be provided so that the locking device 10 ensures for the opening as well as the closing movement an optimal guiding action and, in particular upon closing of the folding top 1, an optimal tensioning force for seal-tightness of the system with the rear window 4 resting on the top cloth side rail 3 can be generated.

What is claimed is:

1. A convertible vehicle comprising:
   a carbody;
   a foldaway top connected to the carbody so as to fold from a closed position into an open position and back;

a top compartment adapted to receive the foldaway top when folded into the open position;

a top compartment lid for closing the top compartment, wherein the top compartment lid extends within a rear carbody contour of the carbody;

a hinge device connected to the carbody and to a rear end of the top compartment lid so that the top compartment lid is pivotable relative to the carbody;

the hinge device comprising a support part and being pivotable relative to the support part;

the foldaway top having a lateral top cloth side rail;

the top compartment lid having a front end adapted to interact relative to the foldaway top with at least one locking device provided in the area of the lateral top cloth side rail, wherein the top compartment lid is lockable on the top cloth side rail by a push-pivot movement and is released by a movement carried out in reverse;

at least one lifting drive acting on the top compartment lid and pivotably connected with a first end to the top compartment lid at a spacing from the hinge device and pivotably connected with a second end on the carbody;

wherein a lifting force that is introduced by the at least one lifting drive into the top compartment lid is transferred directly into an actuation of hinge parts of the hinge device in the area of the hinge device pivotable relative to the support part.

2. The convertible vehicle according to claim 1, wherein the top comprises a rear window integrated into a top cloth of the top, wherein the rear window is adapted to be placed onto the top compartment lid interacting with the at least one locking device and the at least one lifting drive.

3. The convertible vehicle according to claim 2, wherein the rear window comprises a connection to the top cloth side rail which connection is effective when the top cloth side rail is moved.

4. The convertible vehicle according to claim 2, wherein the at least one lifting drive imparts onto the rear window resting on the top cloth side rail a tensioning force ensuring seal-tightness.

5. The convertible vehicle according to claim 1, wherein the top compartment lid and the support part are pivotable together and relative to one another.

6. The convertible vehicle according to claim 1, further comprising an actuator having a first end pivotably connected to the at least one lifting drive and a second end connected to the top compartment lid.

7. The convertible vehicle according to claim 6, wherein the top compartment lid is movable on a movement path that is determined substantially by the actuator and the support part of the hinge device.

8. The convertible vehicle according to claim 6, wherein the actuator and the hinge device together define a guide unit comprising at least three hinges arranged in serial configuration, wherein a first one of the hinges connects the at least one lifting drive to the actuator, a second one of the hinges connects the top compartment lid to the support part of the hinge device, and a third one of hinges provides a pivoting support of the support part of the hinge device on the carbody.

9. The convertible vehicle according to claim 8, wherein the serial configuration comprises additional hinges in addition to the first, second and third hinges and all of the hinges define partial movement paths of a hinge kinematics of the top compartment lid.

10. The convertible vehicle according to claim 8, wherein the guide unit interacts synchronously with movable parts of the at least one locking device at least during some phases of an opening movement or closing movement of the top compartment lid.

11. The convertible vehicle according to claim 6, wherein the at least one lifting drive has a first end connected to the actuator and a second end remote from the actuator, wherein the second end is pivotably supported.

12. The convertible vehicle according to claim 6, wherein the at least one lifting drive is a hydraulic cylinder that is pivotably connected to the actuator, wherein the actuator is a lever arm having a distal end remote from the hydraulic cylinder and the distal end is stationarily connected to an underside of the top compartment lid.

13. The convertible vehicle according to claim 12, wherein the lever arm is connected to the underside in an area between the at least one locking device and the hinge device.

14. The convertible vehicle according to claim 13, wherein the support part of the hinge device is an L-shaped pivot lever that pivotably supports the top compartment lid, wherein the L-shaped pivot lever in an opening phase of the top compartment lid is movable against a stop and in a closing phase of the top compartment lid is pivoted away from the stop.

15. The convertible vehicle according to claim 1, wherein the at least one lifting drive having a lifting axis comprises a hinge connection that is connected in a lower rear area of the carbody and enables pivoting of a vertical support axis.

16. The convertible vehicle according to claim 1, wherein the at least one lifting drive is pivotable parallel to a longitudinal center axis of the convertible vehicle.

17. The convertible vehicle according to claim 1, wherein upon actuation of the at least one lifting drive two movement phases passing substantially continuously into one another are imparted onto the top compartment lid.

18. The convertible vehicle according to claim 1, wherein a movement of the top compartment lid in the area of the at least one locking device is effective, at least over phases thereof, as a push movement for locking or unlocking the at least one locking device.

19. The convertible vehicle according to claim 1, wherein the at least one locking device is comprised of two modules each comprising an abutment and a catch hook, wherein a first one of the two modules provides a connection to the top cloth side rail and a second one of two modules provides a connection to the vehicle carbody.

20. The convertible vehicle according to claim 19, wherein the abutments are slide guides, respectively, in which the catch hooks are guided during a pushing phase of the push-pivot movement.

21. The convertible vehicle according to claim 19, wherein the two modules each are provided with at least one tactile sensor for detecting a position of the catch hook.

22. The convertible vehicle according to claim 19, wherein the abutment has adjustable guide paths in the area of the slide guide.

* * * * *